July 12, 1938. W. LESSEL 2,123,571
ELECTRIC WELDING
Filed Jan. 25, 1937
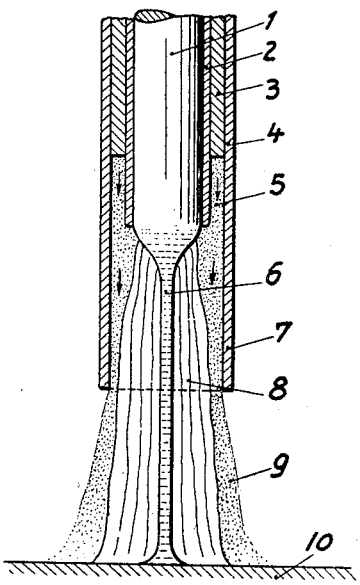
Inventor:
W. Lessel
By: Glascock Downing & Seefeld
Attys.

Patented July 12, 1938

2,123,571

UNITED STATES PATENT OFFICE 2,123,571

ELECTRIC WELDING

Wolfgang Lessel, Berlin-Charlottenburg, Germany

Application January 25, 1937, Serial No. 122,295
In Germany January 29, 1936

6 Claims. (Cl. 219—8)

In electric arc welding of copper by the Slavianoff method only those electrodes have been found to be suitable which contained in addition to copper considerable quantities of other metals, for example bronze.

As a result it has always been impossible to impart to the weld the properties of the base material being worked (in a mechanical and chemical aspect).

All attempts to weld copper workpieces electrically with electrodes of pure copper, or those with very small quantities of admixtures, such as is usual in autogenous welding, have not led to satisfactory results. In every case the welded seam showed numerous unjoined places and was so permeated with slag and pores that it possessed only low mechanical properties. These difficulties are brought about more particularly by the high heat conductivity of the copper, for the heat supplied to the welding place by the arc is too rapidly led away into the workpiece so that at the welding place itself the heating is insufficient.

Hitherto, attempts have been made to circumvent these difficulties by giving the weld place a continuous additional preheating by means of a second heat source. It was possible in this way to supply enough heat to the weld place so that, at least when using a bronze rod, a sufficiently large fusion bath could be produced, but in the case of a copper rod even the preheating was insufficient. The preheating however is attended by certain disadvantages, such as the consequences of thermal expansion and the shrinkage powers of the workpiece which, in the case of rigid or stressed pieces, can lead to the formation of cracks. The advantages of the metal arc welding (point-like heat supply at the weld place and consequently low thermal stresses) were, therefore, completely annulled.

The problem underlying the present invention, therefore, is to bring about the advantages of metal arc welding for the welding of workpieces of copper. According to the above statements it depends on the knowledge that the increase of heat supply necessary on account of the properties of copper must, if the preheating is to be dispensed with, be effected by the arc alone. First it was ascertained by systematic experiments that the necessary high quantity of energy (apparent from the physical constants) which converts the copper into the fused melt can be transferred only with the aid of a very long arc if no additional energy source is to be used. In contradistinction to the short arcs of 2 to at most 5 millimeters length hitherto exclusively used in metal arc welding, the process of the present invention contemplates an arc at least 10 to approximately 40 millimeters long, and in special cases the arc may be longer. A long arc of this kind can of course be produced only with current of comparatively high tension. The present invention, therefore, employs current of at least 40 volts, preferably 70–80 volts, but still higher tensions may be used.

However, when a bare copper electrode is used for welding according to this method then the long path of the fused metal traverses considerable oxidation and gas absorption takes place, with the result that seams are obtained having many pores and containing oxide (e. g. lower oxide). The sensitivity of the copper in this respect is indeed well known from its metallurgy. Moreover, an arc of such length can scarcely be maintained even with the usual thickly ensheathed electrodes, since it is very restless, dances about and splashes the electrode material melting off. Since the arc continuously changes its place of contact with the workpiece proper fusion of the base material cannot occur.

These difficulties, however, are removed by the present invention.

In developing the present invention an auxiliary wire was used which comprised a rod of electrolytic or slightly alloyed copper, such as is usual in the autogenous welding of copper. Such auxiliary wires as in well known alloys in general contain less than 2% of impurities. Owing to such small alloy constituents the gas solubility and oxide formation are already diminished and the flow improved. In the course of the experiments it was found that for special purposes (overhead welding and others) the rod of the electrode according to the invention may also with advantage consist of bronze.

Heretofore the ensheathing mass for copper electrodes was composed according to principles for the ensheathing of steel electrodes. In developing the present invention the proved fluxing agents for autogenous welding were used. These fluxing agents chiefly consist for example of a mixture of boron compounds and alkali phosphates with smaller additions of fluorides and chlorides. The basic mixture of these fluxing agents is, as is well known, so chosen that they melt at a comparatively low temperature and also are suitable for alloys which become liquid at 850–900° C.

By varying this mixture, such as by increasing the content of difficultly fusible alkali phosphates, fusion point and temperature of action were disposed in the neighbourhood of the fusion point of the copper. The melting point interval amounts to about 850–1060° C. The composition of the ensheathing mass is for example: 50 parts of boric acid, 35 parts of sodium phosphate, 6 parts of common salt, 6 parts of cryolite, 3 parts of glass.

An electrode having such a sheathing provides the most important characteristic feature of the invention so that when used in welding the sheathing is fused off later than the metal rod and to such an extent that the sheathing forms a tubular or hose-like end in which the arc travels. The length of this tube amounts to one to six times the diameter of the metal rod.

By this means the following advantages are attained:

1. The arc becomes steady and is guided in a definite direction (direction of the axis of the electrode).

2. The drops of the electrode melting off no longer splash about. The drops are guided in a definite direction by the tube (like the ball in a pistol barrel), namely in the direction of the arc, with the result that they hit the place of the workpiece fused by the arc.

3. The drops are withdrawn from the influence of the air, in that initially they move in the tube-like end of the sheathing and later in the interior of the arc.

By this means the weld formed is tight and free from oxide (e. g. lower oxide) and everywhere a satisfactory union is produced.

The formation of the tubular-like end on welding with an electrode according to the invention is attained in the first place by the choice and the quantity of the added high-melting alkali phosphates and similar salts, and secondly by the regulation of the wall thickness of the sheathing; and, thirdly, by adjusting these two circumstances the electrodes can be extensively adapted for various practical requirements.

The application of the sheathing mass described above to the electrode rod can be effected, for example, by dissolving or suspending the mass in a varnish of alcohol and nitrocellulose and then repeatedly dipping the metal rod of for example 4 millimeters diameter therein until the total diameter of the electrode amounts to 6–7 millimeters.

A further characteristic of the invention consists in the application of a separate additional layer onto the metal rod, which will still further improve the protection of the metal fused off from the wire from oxidation. By exhaustive experiments it has been found that ensheathing substances which have reducing properties or evolve inert gases in the hot lead to the formation of a gas stream during the welding which encloses the end of the metal wire melting off and the arc in a tube-like manner and protects them.

In the accompanying drawing this phenomenon is shown diagrammatically and in the example illustrated 1 is the copper rod, 2 is a thin sheathing of slag-forming and flow-promoting agents, say of the above composition. 3 is a casing of a mass which produces a reducing or inert gas, and 4 is the outermost casing, which, in this example, has the same composition as the casing 2 and forms the tube-like end during the welding. The layer 2 may, for example, be produced by dipping the electrode in a sodium oxalate solution; however, all other masses may also be used which separate off a reducing or inert gas, such as for example carbon monoxide, carbonic acid, nitrogen, and others. The drawing indicates the action of the gas sheathing 9 forming during the welding in the tube-like ensheathing end.

The electric arc 8, which forms between the end of the metal rod 1 and the surface of the workpiece to be welded, 10, is disposed within the tube-like end 7 of the layer 4 and is directed by this tube and maintained steady. Under the action of its heat the end of the rod 1 melts off and forms the metal stream 6 which is mixed with slag from the layer 2. The layer 3, which is composed of substances which evolve a reducing gas, melts somewhat earlier than the metal rod 1 and gives up its gas in the annular-shaped hollow space 5, whence it streams downwardly and outwardly and forms the ring-like gas stream 9 which surrounds the arc 8 and so protects the welding material 6 flowing within the arc from contact with the air and consequently from oxidation.

It is known from iron welding to permit the ensheathing mass to project crater-like beyond the end of the electrode (Kjelberg). Such crater, however, is merely the upwardly directed electrode ends, which form a container for the drops to prevent their flowing down. In complete contradistinction to such crater formation, the tube according to the invention has the object of promoting the movement of the drops and furthermore of rendering possible the employment of a long arc.

The invention was also employed on alloys having high copper content, e. g. bronzes, the alloying for the electrode rods corresponding to the work material to be welded. The temperature of the action and the melting point of the ensheathing mass were likewise brought into conformity with the melting points of these working materials, according to the above directions. In this way it is possible to effect useful welds on these working materials by following the fundamental idea of the invention, or adapting electric arc welding for use in connection with workpieces of metals of very high heat conductivity.

I claim:

1. An electrode for arc welding metals of high thermal conductivity, such as copper and its alloys, comprising a metal rod in a sheathing of non-conducting material which melts off subsequent to the melting of the metal rod, the melting of the sheathing being sufficiently retarded so that during the welding a tube of sheathing material projects beyond the end of the metal rod a distance of not more than about six times the diameter of the metal rod, the arc and fluid metal travelling along said tube to the weld place.

2. An electrode for arc welding metals of high thermal conductivity comprising, a metal rod as core, a layer thereon comprising at least one substance capable of evolving non-oxidizing gas under the action of heat, and an outer sheathing of a non-conducting material the melting of which being sufficiently retarded, so that during the welding a tube of sheathing material projects beyond the end of the metal rod and the inner sheathing a distance of about one to six times the diameter of the metal rod and the arc and fluid metal, in a stream of non-oxidizing gas, travel along said tube of non-conducting material.

3. An electrode for arc welding metals of high thermal conductivity comprising a metal rod as core, a layer of slag-forming and flow-promoting agents thereon, on the latter layer a layer comprising at least one substance capable of evolving non-oxidizing gas under the action of heat, and an outer sheathing of a non-conducting material the melting of which being sufficiently retarded so that during the welding a tube of sheathing material projects beyond the end of the metal rod and the inner sheathing a distance of about one to six times the diameter of the metal rod and the arc and fluid metal, in a stream of non-oxidizing gas, travel along said tube of non-conducting material.

4. An electrode for arc welding metals of high thermal conductivity, such as copper, comprising a copper rod as core, a layer of slag-forming and flow-promoting agents thereon, on the latter layer a layer comprising at least one substance capable of evolving non-oxidizing gas under the action of heat, and an outer sheathing consisting of boric acid 50 parts, sodium phosphate 35 parts, common salt 6 parts, cryolite 6 parts and glass 3 parts, so that when the electrode is in use the arc and fluid metal travel in a stream of non-oxidizing gas along a tube formed by the outer sheathing at the end of the electrode as a result of its retarded capability of melting off.

5. An electrode for arc welding metals of high thermal conductivity such as copper and the alloys thereof comprising, a metal rod arranged in a sheathing of non-conducting material which is adapted to melt subsequent to the melting of said metal rod, the melting of said sheathing being sufficiently retarded so that during the welding process a tube-like end of the sheathing material projects beyond the end of the metal rod at a distance of about one to six times the diameter of said metal rod whereby the arc and the fluid metal will be confined within and travel along said tube to the weld place.

6. An electrode as claimed in claim 5 the sheathing of which comprises substances which under the action of heat evolve non-oxidizing gas and which evolve this gas at a temperature somewhat below the melting point of the metal rod.

WOLFGANG LESSEL.